United States Patent [19]

Grimpe

[11] 4,262,500

[45] Apr. 21, 1981

[54] OVERLOAD CONTROL DEVICE BETWEEN TWO REVOLVING MACHINE PARTS

[75] Inventor: Karl Grimpe, Mülheim, Fed. Rep. of Germany

[73] Assignee: Mannesmann Demag Ag, Fed. Rep. of Germany

[21] Appl. No.: 23,142

[22] Filed: Mar. 23, 1979

[30] Foreign Application Priority Data

Apr. 1, 1978 [DE] Fed. Rep. of Germany ....... 2814180

[51] Int. Cl.$^3$ ............................ F16D 3/56; F16D 7/00
[52] U.S. Cl. ........................................ 64/28 R; 64/12;
403/335; 403/338
[58] Field of Search ............................ 64/28, 12 R, 6;
403/335, 338, 2

[56] References Cited

U.S. PATENT DOCUMENTS

| | | | |
|---|---|---|---|
| 2,327,604 | 8/1943 | McCartney | 64/12 |
| 3,851,498 | 12/1974 | Rice | 64/12 |
| 3,975,923 | 8/1976 | Grimpe | 64/28 R |

Primary Examiner—Henry K. Artis
Attorney, Agent, or Firm—Mandeville and Schweitzer

[57] ABSTRACT

The invention refers to an overload control device between two revolving machine parts having substantially semicylindrical lugs or extensions uniformly distributed over the circumference. Two lugs, pertaining to two different machine parts, form cylinders with partition areas parallel with the direction of rotation of the machine parts, surrounded by hollow power-transmitting carrier drive links connecting the machine parts, and severing the connection by breaking in case of an overload. The carrier drive links consist of hollow cylinders made of high-duty, inflexible material mounted upon and surrounding the lugs under an initial stress.

8 Claims, 4 Drawing Figures

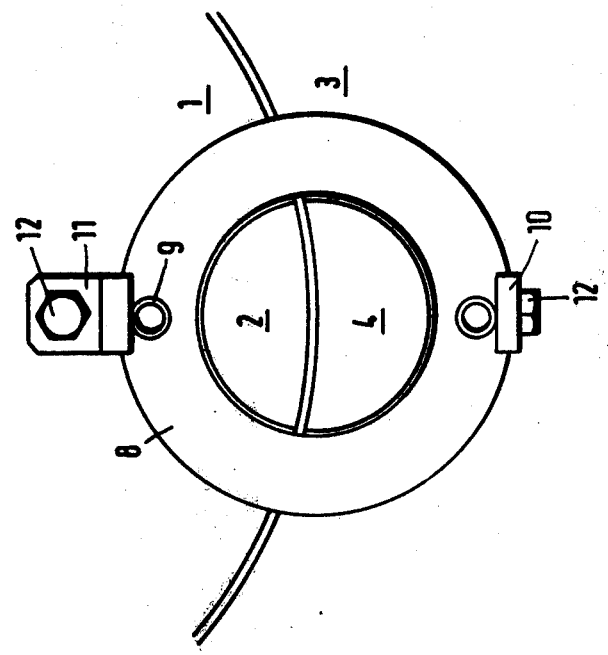
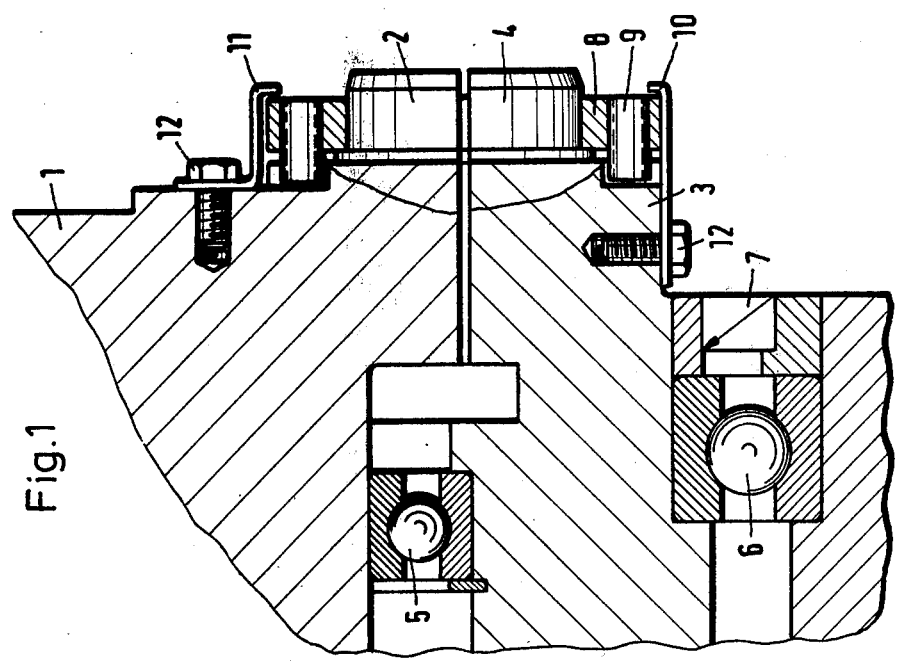

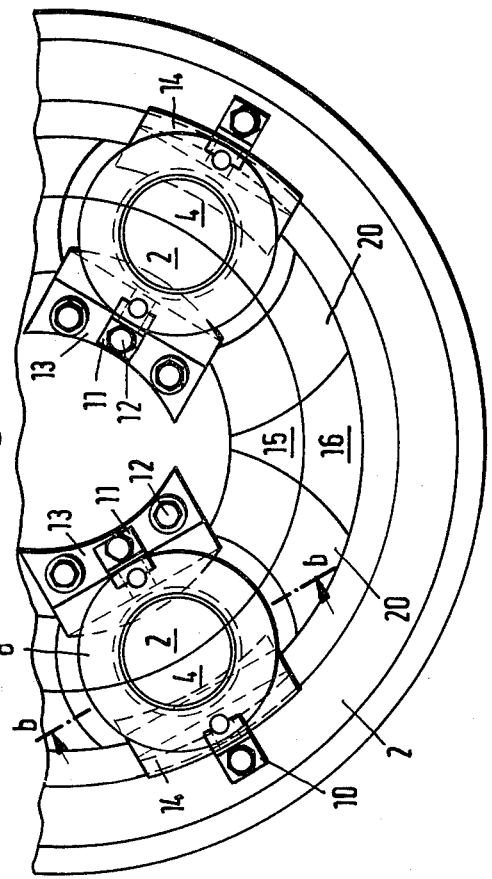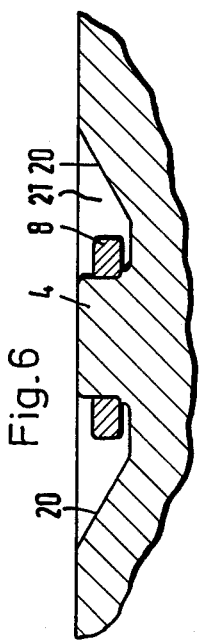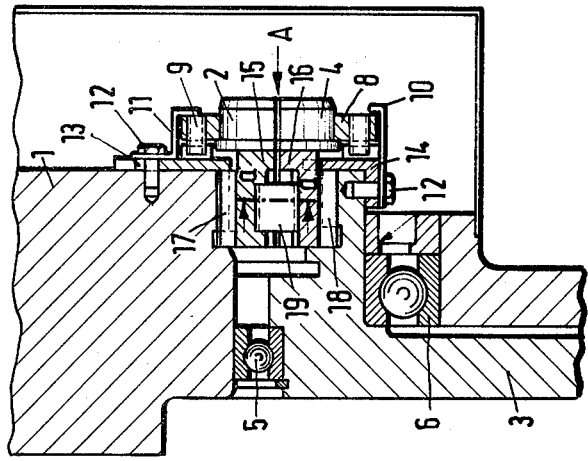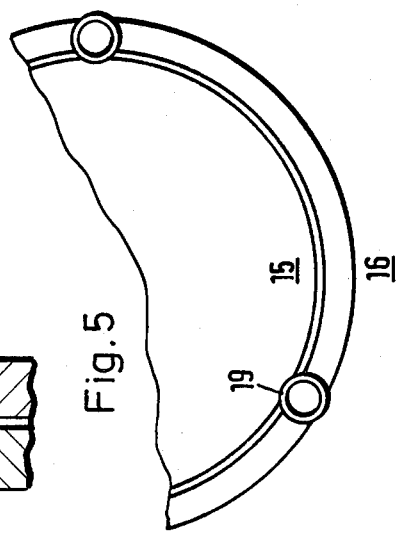

OVERLOAD CONTROL DEVICE BETWEEN TWO REVOLVING MACHINE PARTS

BACKGROUND AND STATEMENT OF THE INVENTION

This type of device is used in order to limit torque mechanically, e.g. in drive shafts or similar structural parts next to clutches with break bolts, slide clutches, clutches with radial serrations, and others. The clutch used on which the invention is based is commonly employed as a shaft coupling, with the lugs surrounded by so-called carrier links extending in a radial direction. This is not the ideal solution for direct use in larger machine combinations as it requires two axially aligned stubs.

The present invention is an overload control device of the type mentioned initially arranged so as to make it usable for machinery which do not have opposing shaft ends. One machine part is a shaft, and the cooperating machine part is a concentric hub, so that the lugs may be arranged at the faces of the machine parts, extending axially. Thus, a control device is provided which, while using the advantages of the familiar device, is well suited to protect machinery with construction which does not permit the use of shaft couplings. Preferably three lugs, uniformly distributed over the circumference, are provided which are surrounded by hollow cylindrical carrier links or rings.

Another detail of the invention is that the lugs and, if applicable, at least a portion of the adjacent link stripper, or scraping surfaces of the machine parts are separate and replaceable. This results in an easy interchangeability of parts damaged, should this be the case, as well as simplified manufacture of the replacement parts.

According to a very favorable feature of the invention, provision is made to arrange, between the machine shaft and the machine hub, a concentric ring, centrally divided in a peripheral direction. The concentrically divided ring halves are provided with serrations at the outer and inner circumference thereof for engaging with the corresponding serrations in the machine parts. The divided ring, on both sides of the central division thereof, has one each of the two substantially semi-cylindrical lug halves. This allows for a favorable interchangeability of the parts representing the overload control. The manufacture of the overload control, and subsequent installation into existing parts is, therefore, made simple. The centrally divided ring is kept in place by means of supports attached to end faces of the machine parts, and overlapping the end faces of the divided ring. These supports prevent the ring from falling from the machine part.

In order to make it easier to install the substantially semi-cylindrical lugs in the proper position after having disconnected the overload control, the invention provides for inserting into the partition line of the divided ring spring biased cylinders which lock into corresponding recesses. Preferably, the number of cylinders matches the number of hollow cylindrical carrier links.

An example of the invention is shown in the figures as follows:

DESCRIPTION OF THE DRAWINGS

FIG. 1 is a partial sectional view of control apparatus illustrating the invention;

FIG. 2 is a plan view of the apparatus of FIG. 1;

FIG. 3 is a partial sectional view of a further embodiment of apparatus illustrating the invention;

FIG. 4 is a plan view of the apparatus of FIG. 3;

FIG. 5 is a sectional view taken along lines a—a of FIG. 3; and

FIG. 6 is a sectional view taken along lines b—b of FIG. 4.

DETAILED DESCRIPTION OF THE INVENTION

In FIG. 1, 1 is a shaft, and 3 is a hub. Hub 3 and shaft 1 are arranged rotatable with regard to each other by means of roller bearings 5 and 6. Packing is provided by radial annular seal 7. The substantially semi-cylindrical lugs 2 and 4 are surrounded by carrier links 8 developed as hollow cylinders which are applied to the lugs under initial stress. The hollow cylindrical carrier links 8 which break under overload conditions, are secured against turning means of expansion sleeves 9. In addition, retaining brackets 10, 11, attached to machine parts 1 and 3 by means of screws 12, prevent carrier links 8 from dropping.

FIG. 2 has the same numbers for the same parts, and shows the partition area between the substantially semi-cylindrical lugs extending between the substantially semi-cylindrical lugs according to the outer circumference of shaft 1 and the inner circumference of hub 3.

FIG. 3 shows another embodiment with like numbers for like parts. This example provides between shaft 1 and hub 3 ring 15, 16 centrally divided peripherally, with half 16 serrated at the outer circumference adjacent hub 3 and half 15 is serrated at the inner circumference adjacent shaft 1. A matching serration is provided in the opposite parts of shaft 1 and hub 3. The semi-cylindrical lugs 2 and 4 are provided on halves 15 and 16 of the ring. The ring halves 15 and 16 are engaged by shaft 1 and hub 3, respectively, via serrations 17 and 18. Coupling between shaft 1 and hub 3 is effected, as in the previous example, by means of the hollow cylindrical carrier links 8, surrounding lugs 2 and 4 and placed there under initial stress. In the last example, too, the carrier links 8 are secured by retaining brackets 10, 11, as described before. FIG. 4 shows a plan view of the variant according to FIG. 3, where like parts are identified by like numbers. FIG. 4 shows supports 13 and 14 holding serrated rings 15 and 16 axially of shaft 1.

FIG. 5 is a sectional view along line a—a in FIG. 3. It shows that spring biased cylinders 19 are locked into serrated rings 15 and 16, for the purpose of restoring the correct position after hollow cylindrical lugs 2 and 4 have been disconnected. Cylinders 19 lock into corresponding recesses. The number of cylinders 19 preferably matches that of the carrier links 8.

FIG. 6 is a sectional view through one of the lugs 4 in FIG. 4 along line b—b. Lugs 2 and 4 are arranged in an indentation 21. The indentations have, at the sides opposite lugs 2, 4, sloped sides 20 for easing the stripping off of the remaining halves of carrier links 8 after disconnection. It is understood that such sloped sides are also provided at rings 15 and 16, or according to the first example in FIG. 1 at shaft part 1 and hub part 3.

Mode of operation: When ready for operation, lug halves 2 and 4 of shaft part 1 and hub part 3 form a cylinder with the respective opposite lug half, such cylinder being surrounded by carrier link 8 under initial stress. As soon as the overload safeguard is overloaded, carrier links 8 break and permit a relative movement of lug halves 2 and 4 relative to each other. Inclinations 20 as shown in FIG. 6 strip off the broken carrier links 8.

The hollow cylindrical carrier links 8 have exactly definable stress characteristics as required. Moreover, as will be understood, the shaft-hub parts in the lug area are surrounded by a protective device preventing random whirling about of broken carrier links. If an overload has occurred followed by disconnection, new carrier links 8 are installed and the overload device will be ready for operation with the least possible delay.

I claim:

1. Overload control apparatus for use between two revolving parts, comprising
   (a) a first machine part having an end face;
   (b) a second machine part having an end face;
   (c) at least one first semi-cylindrical lug extending from said end face of said first machine part;
   (d) at least one second semi-cylindrical lug extending from said end face of said second machine part, the number of said second semi-cylindrical lugs being equal to the number of said first semi-cylindrical lugs;
   (e) each one of said first semi-cylindrical lugs cooperating with one of said second semi-cylindrical lugs to form a cylinder;
   (f) an annular power-transmitting carrier link formed of a strong rigid material embracing each of said formed cylinders under an initial stress;
   (g) said first machine part is a shaft;
   (h) said second machine part is a hub concentric with said shaft; and
   (i) said cylinders formed by said first and second semi-cylindrical lugs extend axially from said end faces of said shaft and hub.

2. The apparatus of claim 1, further characterized by
   (a) an indentation in said end faces of said shaft and said hub surrounding said formed cylinders;
   (b) the side wall of each indentation being inclined; and
   (c) each said inclined side wall extending from the bottom of said indentation away from the lugs of said shaft and said hub to form a stripper surface.

3. The apparatus of claim 2, further characterized by
   (a) each of said first and second semi-cylindrical lugs and associated stripper surface having separate replaceable parts.

4. The apparatus of claim 3, further characterized by
   (a) a cooperating annular divided ring in said end faces of said shaft and hub;
   (b) said annular ring being divided circumferentially to form a pair of ring halves with one half in said shaft end face and one half in said hub end face;
   (c) said first semi-cylindrical lugs and said second semi-cylindrical lugs being located on their respective ring half; and
   (d) cooperating gripping means on the opposed circumferential surfaces of said shaft and hub and their adjacent respective ring halves.

5. The apparatus of claim 4, further characterized by
   (a) at least one bracket extending from said shaft and said hub over their adjacent respective ring halves for maintaining said ring halves in place.

6. The apparatus of claim 5, further characterized by
   (a) at least one opposed cooperating semi-cylindrical recesses located in said ring halves; and
   (b) a receivable cylinder for each of said cooperating recesses.

7. An overload control apparatus as claimed in claim 1, wherein two or more formed cylinders are used and said formed cylinders are uniformly distributed around said end faces of said shaft and hub.

8. An overload control apparatus as claimed in claim 2, wherein the depth of said indentation is at least the thickness of said carrier link.

* * * * *